Patented Dec. 26, 1939

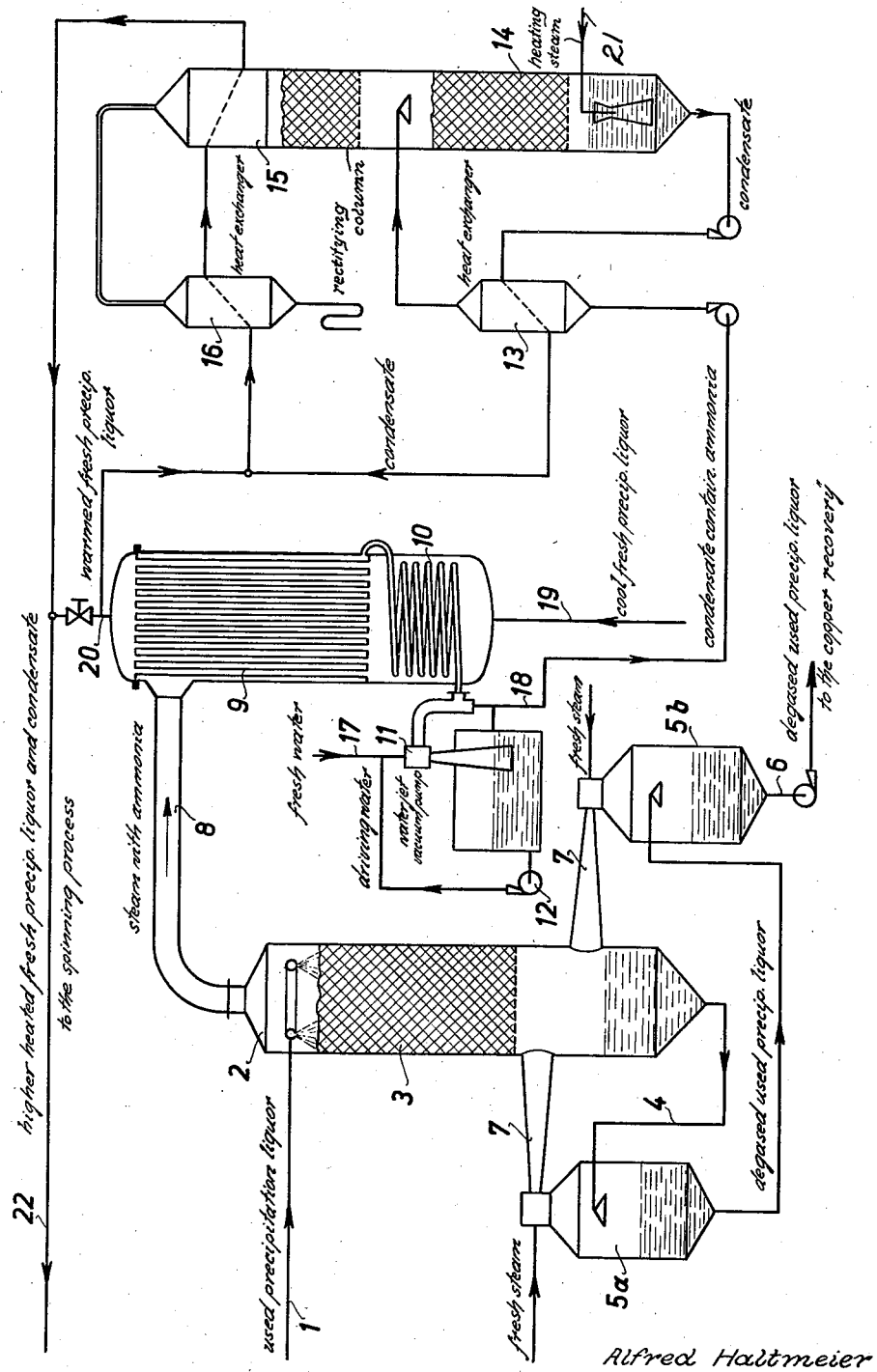

2,184,923

UNITED STATES PATENT OFFICE 2,184,923

PROCESS OF RECOVERING AMMONIA FROM USED CUPRAMMONIUM ARTIFICIAL SILK PRECIPITATION LIQUORS

Alfred Haltmeier, Cologne, Germany, assignor to I. G. Farbenindustrie Aktiengesellschaft, Frankfort-on-the-Main, Germany Application April 6, 1937, Serial No. 135,227
In Germany April 11, 1936

7 Claims. (Cl. 23—193)

This invention relates to a process of recovering ammonia from used cuprammonium artificial silk precipitation liquors.

The used precipitation liquors obtained in large quantities in the manufacture of cuprammonium artificial silk contain ammonia in a concentration of about 0.1 to 2 grams per liter and heat values corresponding to a temperature of about 25–60° C. Theoretically there are no difficulties in removing the ammonia from these used precipitation liquors and the manufacture of ammonia solution which can be reused. In practice the carrying out of the said process hitherto has been impossible since the expenses for removing and concentrating the ammonia are higher than the value of the recovered ammonia. Therefore, in the manufacture of cuprammonium artificial silk so far only the heat of the precipitation liquor is recovered by means of heat exchangers, whereas the ammonia is lost. In the art of separating dissolved gases or vapors from the solvents containing them, one differentiates between chemical and thermal gas extraction processes. The literature relating to such gas extraction processes shows that the thermal process, wherein the liquid from which the gas or vapor is to be extracted is conducted countercurrent to the steam required for the separation, is the most efficient and requires the least expenditure of heat. In simple evaporation of the liquid under atmospheric pressure or in vacuo the steam leaving the degassing apparatus proportionally takes along essentially less of the gas to be removed than in the case of the counter-current process.

It is to be noted that the used precipitation liquor obtained in the manufacture of cuprammonium artificial silk is not a simple solution of ammonia in water, but that the ammonia present is chemically bound to copper oxide in the form of a copper oxide ammonia complex. Therefore, also the conditions required for the removal of the ammonia from the used precipitation liquors are differentiated from those required for the simple aqueous ammonia solutions. Apart from this principal difference it has been established that in the thermal removal of ammonia from used precipitation liquors the least consumption of steam is required also in the case where liquid and steam are conducted in counter-current to one another. The use of heat for producing the steam is, however, also in this case so large that degasing in this manner would not be profitable.

In accordance with the present invention I have found that it is in an economical way possible to recover not only the ammonia but simultaneously also the heat contained in the used precipitation liquors when using the steam necessary for the removal of the ammonia in a counter-current process simultaneously for conveying the heat from the used precipitation liquor into the fresh precipitation liquor. The accompanying flow sheet illustrates schematically the recovery of the ammonia and the heat from used precipitation liquors.

The process according to the invention is, for instance, as follows:— The used precipitation liquor is conducted through a pipe 1 into a counter-current apparatus 2 in which there is a pressure corresponding to the vapor pressure of the water at its introduction temperature. In the counter-current apparatus which is, therefore, under a vacuum the used precipitation liquor trickles over objects with a large surface and of small current resistance, for instance, Raschig rings 3. In this manner, by coming into contact with the steam in counter-current, the greatest part of the ammonia is removed. This steam is obtained from the precipitation liquor coming out of pipe 4 which is degassed to a large extent by evaporation in the apparatus 5a and 5b which are under a lower pressure than the counter-current apparatus 3 by action of the compressors 7, whereby the heat necessary for the steam formation is taken from the precipitation liquor. Instead of the used precipitation liquor coming out of the counter-current apparatus also any other quantity of water can be evaporated to which the heat of the precipitation liquor has previously been transferred. For economical reasons the evaporation is advantageously performed in several stages, that is to say the two or more evaporation apparatus required are arranged in series with relation to the direction of the flow of the water. The precipitation liquor is then introduced into a copper recovery apparatus from its exit 6 at the last apparatus. The steam obtained in the apparatus 5a and 5b is sucked off by compressors 7 of any desired kind, preferably steam jet compressors, compressed to the pressure present in the counter-current apparatus 2 and blown into the counter-current apparatus. The heat content of this steam therefore consists of the heat taken from the precipitation liquor plus energy employed for the compression to the higher pressure and, if steam jet compressors are used, also is increased by the remaining heat of the steam used therein. On conducting the steam through the counter-current apparatus it becomes more saturated with ammonia. The ammonia content of the steam can be increased, and thereby the quantity of steam necessary for the ammonia transport can be decreased, if small quantities of an alkaline reacting agent adapted to expel the ammonia from the precipitation liquors are added to the precipitation liquor before it enters the counter-current apparatus. The quantity of alkaline reacting agent added with which the greatest saving of steam cost in contradistinction to the cost of the alkali addition is achieved depends on the steam price and is between about 0.1 and 0.8 gram of NaOH per grams of $NH_3$ or the equivalent quantity of another alkaline reacting agent.

The steam coming out of the counter-current apparatus 2, having taken up heat from the degassed precipitation liquors as well as the ammonia, is if the desired, after previous concentration, passed through pipe 8 into the surface condenser 9 where it is condensed. In an absorber 10 which is arranged behind the condenser 9, which can also be connected with the condenser, the condensate is cooled to such an extent that it is capable of dissolving the whole ammonia.

For removing air from the condenser or the condensate cooler connected at the outlet side and thereby from the whole apparatus, preferably a water-jet pump 11 is used, the driving water of which is preferably pumped by means of a pump 12, whereby the ammonia residues going along with the air dissolve in the water. By adding fresh water through pipe 17 and simultaneously taking off ammonia solution through pipe 18, the circulating water can be kept at an ammonia concentration which is about equal to the saturation concentration at the condenser pressure present.

As condenser cooling water the fresh precipitation liquor necessary for the precipitation of the cuprammonium artificial silk is used. This fresh precipitation liquor entering through pipe 19 flows over the heat transmitting surface of absorber 10 and surface condenser 9 and is heated by taking up the condensation heat which is equal to the heat removed from the degased precipitation liquor in the two evaporating apparatus 5a and 5b plus the heat used for compression in steam jet compressors 7. The fresh liquor is thus heated to a temperature which is only slightly lower than that of the used precipitation liquor coming from the precipitation process because of the radiation losses and the temperature difference necessary for the conduction of heat in condenser 9. The heated fresh precipitation liquor leaves condenser 9 at the top through pipe 20.

Contrary to the process according to the invention, in a process working only with simple direct evaporation of the ammonia, that is a process not working in counter-current, the fresh precipitation water can only be heated in the condenser to approximately the temperature of the evaporated water since the ammonia steam mixture formed during evaporation has only the said temperature.

According to the present invention the fresh precipitation liquor can also be obtained by regeneration of the used precipitation liquor. This regeneration consists in removing as much ammonia and copper as possible from the used precipitation liquor. The copper can be removed by precipitating the colloidally dispersed copper compounds present in the precipitation liquor which has been degassed to a far-reaching extent by means of a gel. This gel may be obtained from the degassed precipitation liquor itself by coagulation of the colloidal copper compounds. The removal of the gel from the water can be effected by allowing the gel to settle and subsequent filtering.

At a low temperature and high ammonia content of the used precipitation liquor or upon cooling the condenser with still warm regenerated precipitation water also in the condenser a surplus of heat may be present. The surplus of heat must be transferred to fresh water from which part of the heat which has been taken up may be recovered by evaporation, compression of the steam obtained and blowing off the compressed steam into the counter-current apparatus or into the fresh precipitation liquor.

For further concentration of the condensate which contains the ammonia, it is introduced over a heat exchanger 13 into a rectifying column 14 which is heated by steam entering the column through pipe 21. The reflux condenser 15 and the end condenser 16 of the column are preferably cooled by partial currents of the precipitation liquor, or by water which afterwards returns the heat received to the fresh precipitation liquor coming from the condenser 9. By taking up the heat from the rectifying column the fresh precipitation liquor is further heated and in this manner may attain the temperature desired for the precipitation process if the waste heat of the rectifying apparatus is fixed accordingly. The heated fresh precipitation liquor is introduced into the spinning process by pipe 22. On the other hand with the admission of more heat the efficacy of the rectifying apparatus can be increased. The ammonia solution obtained therein is used as batch for spinning solutions.

If the waste heat of the rectifying column is used otherwise or is not sufficient for heating the fresh precipitation liquor coming from the condenser 9 to the desired temperature it is advantageous to increase the pressure and therewith the temperature in the condenser by increased evaporation in the evaporators 5a and 5b, and increase the compression energy and therewith increase the steam current in the counter-current apparatus to such an extent that the desired increase of cooling water exit temperature of the condenser 9 is obtained.

The present invention makes it possible for the first time, by the combined recovery of ammonia and heat, to restrict the amount of least required for the recovery of ammonia in an economical manner which hitherto has not been possible.

I claim:

1. The process of recovering ammonia and heat from used cuprammonium artificial silk precipitation liquors which comprises bringing the warm liquors with substantially the temperature they have when coming from the precipitation treatment into counter-current contact with a current of steam having a pressure corresponding substantially to the pressure of saturated steam at a temperature equal to the temperature of the liquors, at least a part of said steam being obtained by evaporation of the still warm precipitation liquors after the counter-current treatment at a pressure lower than that of said steam employed for the counter-current treatment of said precipitation liquors and compressing said part of the steam to the pressure employed for the counter-current treatment, introducing said compressed steam into the counter-current apparatus and removing the ammonia and the steam carrying the ammonia and condensing the ammonia and the steam together.

2. The process of recovering ammonia and heat from used cuprammonium artificial silk precipitation liquors which comprises bringing the warm liquors with substantially the temperature they have when coming from the precipitation treatment into counter-current contact with a current of steam having a pressure corresponding substantially to the pressure of saturated steam at a temperature equal to the temperature of the liquors at least a part of said steam being obtained by evaporation of the still warm precipitation liquors after the counter-current treatment and at a pressure lower than that of said steam and compressing said part of the steam by means of a steam jet to the pressure used in the counter-current treatment, introducing said compressed steam into the counter-current apparatus and removing the ammonia and the steam carrying the ammonia by condensing the ammonia and the steam together.

3. The process of recovering ammonia and heat from used cuprammonium artificial silk precipitation liquors which comprises bringing the warm liquors with substantially the temperature they have when coming from the precipitation treatment into counter-current contact with a current of steam having a pressure corresponding substantially to the pressure of saturated steam at a temperature equal to the temperature of the liquors at least a part of said steam being obtained by evaporation of the still warm precipitation liquors after the counter-current treatment and at a pressure lower than that of said steam and compressing said part of steam by means of a steam jet to the pressure maintained in the counter-current treatment, introducing said compressed steam into the counter-current apparatus and removing the ammonia and the steam carrying the ammonia and obtaining the heat values contained therein by condensing the ammonia and the steam together by bringing the ammonia and the steam in heat exchange relationship with a medium adapted to take up the heat, so that the heat values are recovered in an utilisable form.

4. The process of recovering ammonia and heat from used cuprammonium artificial silk precipitation liquors which comprises bringing the warm liquors with substantially the temperature they have when coming from the precipitation treatment into counter-current contact with a current of steam having a pressure corresponding substantially to the pressure of saturated steam at a temperature equal to the temperature of the liquors at least a part of said steam being obtained by evaporation of the still warm precipitation liquors after the counter-current treatment and at a pressure lower than that of said steam and compressing said part of steam by means of a steam jet to the pressure maintained in the counter-current treatment, introducing said compressed steam into the counter-current apparatus and removing the ammonia and the steam carrying the ammonia and obtaining the heat values contained therein by condensing the ammonia and the steam together by bringing the ammonia and the steam in heat exchange relationship with water to be used in the precipitation of cuprammonium artificial silk.

5. The process of recovering ammonia and heat from used cuprammonium artificial silk precipitation liquors which comprises bringing the warm liquors with substantially the temperature they have when coming from the precipitation treatment into counter-current contact with a current of steam having a pressure corresponding substantially to the pressure of saturated steam at a temperature equal to the temperature of the liquors at least a part of said steam being obtained by evaporation of the still warm precipitation liquors after the counter-current treatment in several stages at decreasing pressures, said pressures being lower than the pressure of said steam employed for the counter-current treatment of said precipitation liquors, the steam evaporated in each stage being compressed to the pressure employed for the counter-current treatment of said precipitation liquors, introducing said compressed steam into the counter-current apparatus and removing the ammonia and the steam carrying the ammonia by condensing the ammonia and the steam together.

6. The process of recovering ammonia and heat from used cuprammonium artificial silk precipitation liquors which comprises bringing the warm liquors with substantially the temperature they have when coming from the precipitation treatment into counter-current contact with a current of steam having a pressure corresponding substantially to the pressure of saturated steam at a temperature equal to the temperature of the liquors at least a part of said steam being obtained by evaporation of the still warm precipitation liquors after the counter-current treatment in several stages at decreasing pressures, said pressures being lower than the pressure of said steam employed for the counter-current treatment of said precipitation liquors, the steam evaporated in each stage being compressed to the pressure of the succeeding stage and in the last stage to substantially the pressure employed for the counter-current treatment of said precipitation liquors, introducing said compressed steam into the counter-current apparatus and removing the ammonia and the steam carrying the ammonia by condensing the ammonia and the steam together.

7. Process according to claim 1 in which an alkaline reacting substance adapted to expel the ammonia from the precipitation liquors is added to the precipitation liquors before the counter-current treatment.

ALFRED HALTMEIER.